United States Patent [19]

Lew

[11] Patent Number: 5,503,466

[45] Date of Patent: Apr. 2, 1996

[54] SKATE WHEEL

[75] Inventor: Paul E. Lew, Carmel, Ind.

[73] Assignee: Wear and Tear, Inc., Indianapolis, Ind.

[21] Appl. No.: 189,847

[22] Filed: Feb. 1, 1994

Related U.S. Application Data

[63] Continuation-in-part of Ser. No. 147,659, Nov. 4, 1993.

[51] Int. Cl.$^6$ .................................................. B60B 5/02
[52] U.S. Cl. ..................... 301/5.3; 152/323; 280/11.22
[58] Field of Search ..................... 301/5.3, 5.7, 11.1, 301/11.3; 280/11.23, 11.22; 152/323–329, 393, 394; 16/45, 46

[56] References Cited

U.S. PATENT DOCUMENTS

| | | | |
|---|---|---|---|
| 338,576 | 3/1886 | Whitzel | 301/5.3 |
| 726,463 | 4/1903 | Richardsn | 301/5.3 |
| 1,089,899 | 3/1914 | Bosworth | 301/11.3 X |
| 1,725,124 | 8/1929 | Banister . | |
| 1,817,356 | 8/1931 | Fisher | 152/394 X |
| 2,145,343 | 1/1939 | Dempsey | 198/16 |
| 2,307,874 | 1/1943 | Bilde | 18/42 |
| 2,485,304 | 10/1949 | Marsh | 301/5.3 |
| 2,570,349 | 10/1951 | Kardhordo | 301/5.3 |
| 2,878,071 | 3/1959 | Fowlkes | 301/5.3 |
| 3,843,202 | 10/1974 | Lacerte | 301/63 |
| 4,000,926 | 1/1977 | Wilcox | 301/64.2 X |
| 4,030,754 | 6/1977 | Merlette | 301/98 |
| 4,040,670 | 8/1977 | Williams | 301/5.3 |
| 4,208,073 | 6/1980 | Hechinger | 301/5.3 |
| 4,535,827 | 8/1985 | Seaford | 152/7 |
| 5,234,259 | 8/1993 | Nishimuro et al. | 301/64.7 |
| 5,320,418 | 6/1994 | Chen | 301/64.7 X |

FOREIGN PATENT DOCUMENTS 88925   3/1937   Sweden ................................. 301/5.7

*Primary Examiner*—Russell D. Stormer
*Attorney, Agent, or Firm*—Baker & Daniels

[57] ABSTRACT

A skate wheel having a replaceable tread mechanically attachable to and mechanically detachable from a wheel hub. The wheel hub includes a central hub and a tread receiving ring around the hub outer radial periphery. A thread projecting from the tread receiving ring spirals around the outer radial periphery of the tread receiving ring. The replaceable tread includes a tread attaching ring and a ground engaging tread disposed around the circumference of the tread attaching ring. A mating thread projecting from the inner radial periphery of the tread attaching ring spirals around the inner radial periphery of the tread attaching ring. The replaceable tread and wheel hub are connected by the threaded engagement of the threads of the tread receiving ring and tread attaching ring. The present invention also includes a process for forming a high strength, low weight composite hub for the skate wheel.

9 Claims, 5 Drawing Sheets

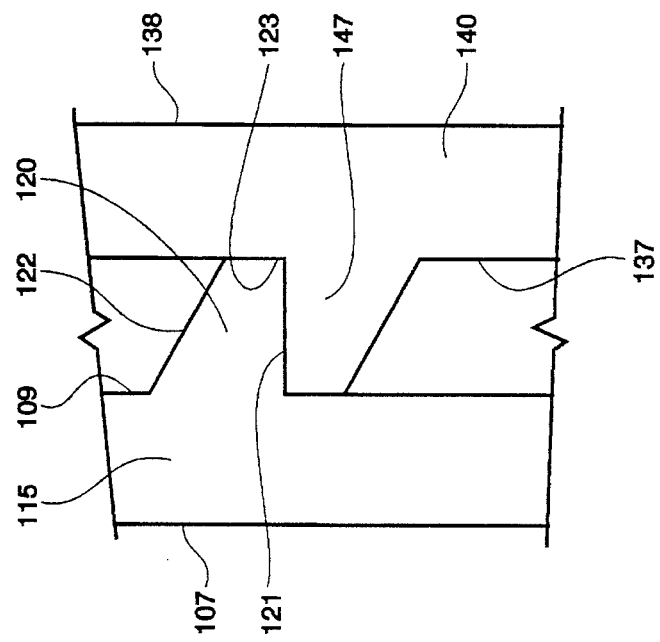
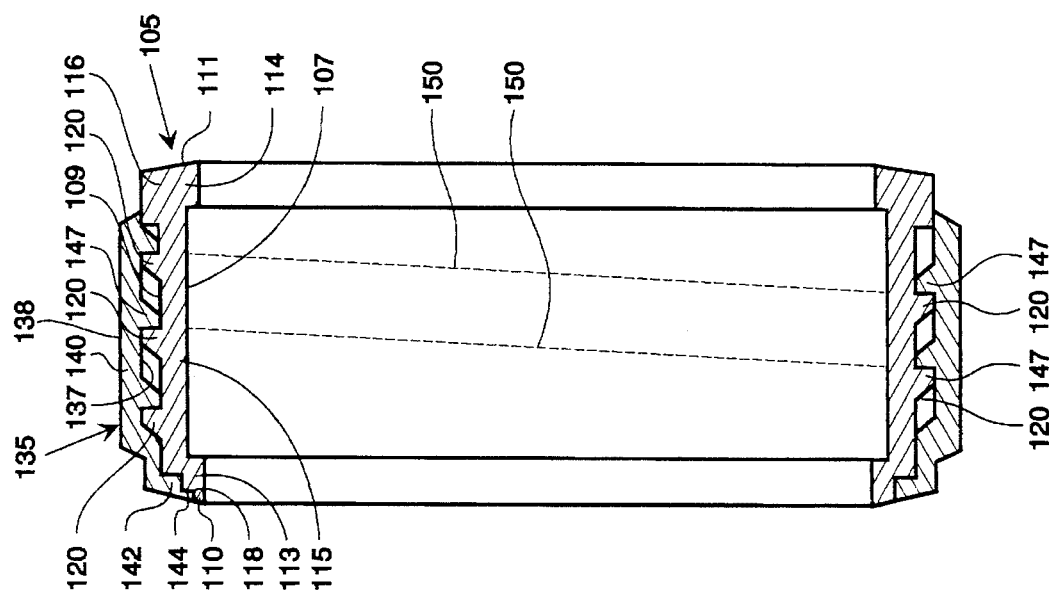

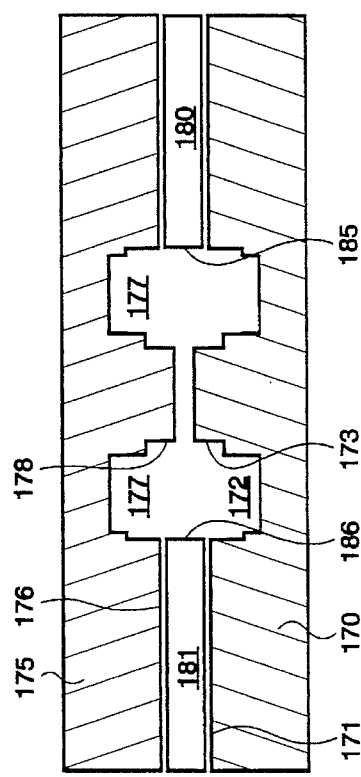
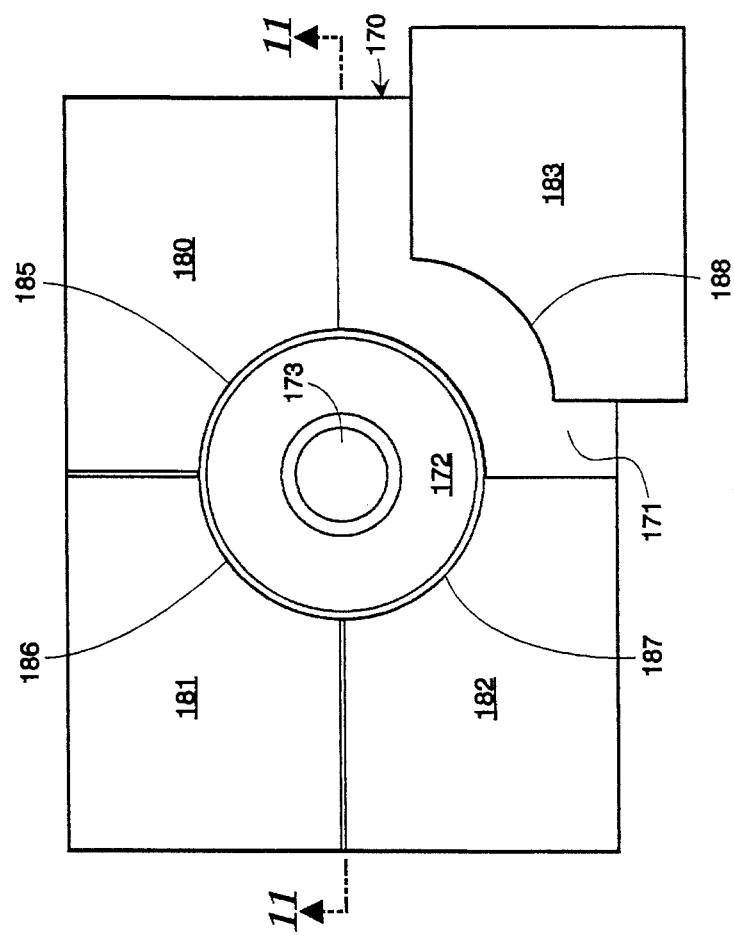
Fig. 11
Fig. 10

SKATE WHEEL

This application is a continuation-in-part of application Ser. No. 08/147,659 filed Nov. 4, 1993.

BACKGROUND OF THE INVENTION

This invention relates to wheels for skates such as inline skates, and, in particular, to skate wheels constructed to minimize wheel weight.

The popularity of roller skating and more particularly inline skating has increased dramatically in recent years. Inline skating speed competitions or races have simultaneously emerged as a popular sporting event. One existing problem with current inline skates used in racing pertains to the relatively heavy weight of the skate which physically burdens the racer and hinders his/her timed performance.

Current inline skates are essentially composed of three components, namely the shoe, the skate wheels, and the frame which mounts the wheels to the boot. In an effort to minimize skate weight and improve racing times, the shoe in some racing inline skate models has been modified to be constructed from lighter plastics or composite materials. Moreover, the heavy steel frames previously used to mount the wheels have been replaced with lightweight but sufficiently strong materials such as aluminum. Despite these improvements, and in order to optimize performance times as well as gain an advantage over fellow competitors utilizing heavier skates, it is still desirable to further lower skate weight by providing lighter weight skate wheels.

Existing inline skate wheel technology is deficient from a weight standpoint for racing competitors for a number of reasons. Typical inline skate wheels employ an injection molded plastic hub having an elastomeric ground engaging tread disposed circumferentially around the plastic hub. Because manufacturers have heretofore attempted to provide skate wheels with a significant operational life, a considerable thickness of elastomeric tread is utilized. For a thicker tread of a given composition, a longer period of wheel use is generally required before the elastomeric tread is worn away to expose the plastic hub. While for many consumers longer wheel life is desirable from a cost standpoint as frequent expensive wheel replacement is not necessitated, the excess tread on the skate wheel not worn off during use must be carried by a skater during the entire competition. A small amount of excess tread on each wheel, multiplied by the number of wheels on such skates, results in a weight burden which wastes valuable racer energy. In addition, the large amount of elastomeric tread causes the wheel to be less rigid overall and as a result is likely to deform and absorb energy rather than transmit energy and increase a skater's speed.

Despite having an advantageous lesser density than metal hubs of the past, the injection molded plastic hub common in inline skate wheels today is also less than ideal for racing. Because the plastic material used to form the hubs is of a limited strength or rigidity, a tradeoff exists between hub rigidity and hub weight. In particular, to make the skate wheel as light as possible, the hubs can be fabricated from a minimal amount of plastic material. However, because these plastic hubs will have a lesser rigidity than hubs constructed from a greater amount of plastic, they tend to experience more multi-directional deformation under strain, which translates to greater wheel wobble when a skater applies a force, for example during turning or pushoff, to the wheel. This deformation dissipates valuable energy. On the other hand, more substantial plastic hubs are less prone to experience wheel wobble. Yet, the more rigid hub translates to a detrimental greater wheel weight which burdens the skater throughout a competition. Thus, it is desirable to provide an inline skate wheel which, while being rigid and strong enough to withstand forces experienced during operation, is constructed to have a limited weight for optimizing timed racing performances.

Another problem with many inline skate wheels is encountered when the tread wears out. Because the user typically can not replace the tread on the skate wheel, the entire skate wheel is discarded despite the fact that the wheel hub itself is still capable of further operation. Thus, it is desirable to provide a skate wheel which provides a replaceable tread to allow a user to further utilize a wheel hub after the present tread expires.

SUMMARY OF THE INVENTION

In one form thereof, the skate wheel of the present invention includes a hub means, for being rotatably coupled to a skate, and a replaceable tread mechanically attachable to and mechanically detachable from the hub means. The hub means includes a tread receiving means. The replaceable tread includes a ground engaging tread and a means for attaching the ground engaging tread to the hub means tread receiving means.

In another form thereof, the skate wheel of the present invention comprises a central hub having an outer radial periphery, a tread receiving ring, a tread attaching ring, and a ground engaging tread. The tread receiving ring has an inner radial surface and an outer radial surface, wherein the inner radial surface is shaped to mate with the central hub outer radial periphery. The outer radial surface includes at least one thread projecting therefrom. The thread spirals around the circumference of the tread receiving ring. The tread attaching ring has an inner radial surface and an outer radial surface, wherein the tread attaching ring inner radial surface is shaped to engage the at least one thread. The ground engaging tread is disposed around the circumference of the tread attaching ring and connected to the tread attaching ring outer radial surface. The ground engaging tread is attachable to the central hub by threadedly engaging the tread attaching ring and the tread receiving ring. The ground engaging tread is detachable from the central hub by threadedly disengaging the tread attaching ring from the tread receiving ring.

In one form thereof, a process for manufacturing a skate wheel hub of the present invention includes the following steps. A mold having a lower mold member, an upper mold member, and a plurality of intermediate mold members is provided. The lower mold member and the upper mold member each include a base surface with both an interior cavity and a projection formed therein. The projection is centrally located within the cavity and extends therefrom. The cavity and projection are shaped to form a side and a bearing mounting region of the skate wheel hub. Each of the intermediate mold members includes an arcuate surface for forming at least a portion of a radial periphery of the skate wheel hub. A first piece of woven fiber fabric is overlaid on the lower mold member to cover the cavity and the projection. An overhanging portion of the first piece of woven fiber fabric extends beyond the entire radial periphery of the cavity. A coating of composite forming material is applied to the first piece of woven fiber fabric. A low density insert, which is preformed in a shape to which an interior of the skate wheel hub is to be formed, is stacked onto the first piece of uncured woven fiber fabric composite. A second piece of woven fiber fabric is stacked on the low density insert, wherein the second piece of woven fiber fabric is sufficiently large that an overhanging portion of the second piece of woven fiber fabric will extend beyond the entire radial periphery of the upper mold member cavity. A coating of composite forming material is applied to the second piece of woven fiber. The upper mold member is stacked onto the second piece of uncured woven fiber fabric composite, and the upper mold member is maintained in a fixed spaced apart relationship with the lower mold member. The intermediate mold members are positioned between the upper and lower mold members and around the entire circumference of the low density insert, and then the intermediate mold members are converged radially inwardly to press the overhanging portions of the first and second pieces of uncured woven fiber fabric composite together and into contact with the low density insert, whereby the overhanging portions can bond together during curing to form the radial periphery of the skate wheel hub. Force is applied to press together the upper and lower mold members while the intermediate members are maintained in a radially converged position. The skate wheel hub is removed from the mold members.

An advantage of the present invention is that it provides an improved performance skate wheel with a light weight hub which is sufficiently sturdy to withstand operational loadings. Another advantage of the present invention is that the limited life tread, or one race tread, of the skate wheel eliminates excess skate wheel weight. Another advantage of the present invention is that the replaceable tread allows a consumer to refit a useful hub to provide a serviceable skate wheel. Other advantages of the present invention will become apparent from the following description.

BRIEF DESCRIPTION OF THE DRAWINGS

FIG. 8 is a radial cross-sectional view of the tread receiving ring and tread attaching ring as shown in FIG. 7, where the central hub and ground engaging tread are removed for purposes of illustration.

FIG. 9 is an enlarged view of a portion of FIG. 8 showing the mating construction of the threads of the tread receiving ring and the tread attaching ring.

FIG. 10 shows a top view of a mold apparatus used in a hub forming process wherein the upper mold member is removed for purposes of illustration.

FIG. 11 shows a cross-sectional side view, taken along line 11—11 of FIG. 10, of the mold apparatus wherein the upper mold member is shown.

Corresponding reference characters indicate corresponding parts throughout the several figures.

DESCRIPTION OF THE PREFERRED EMBODIMENTS

Figure 2:
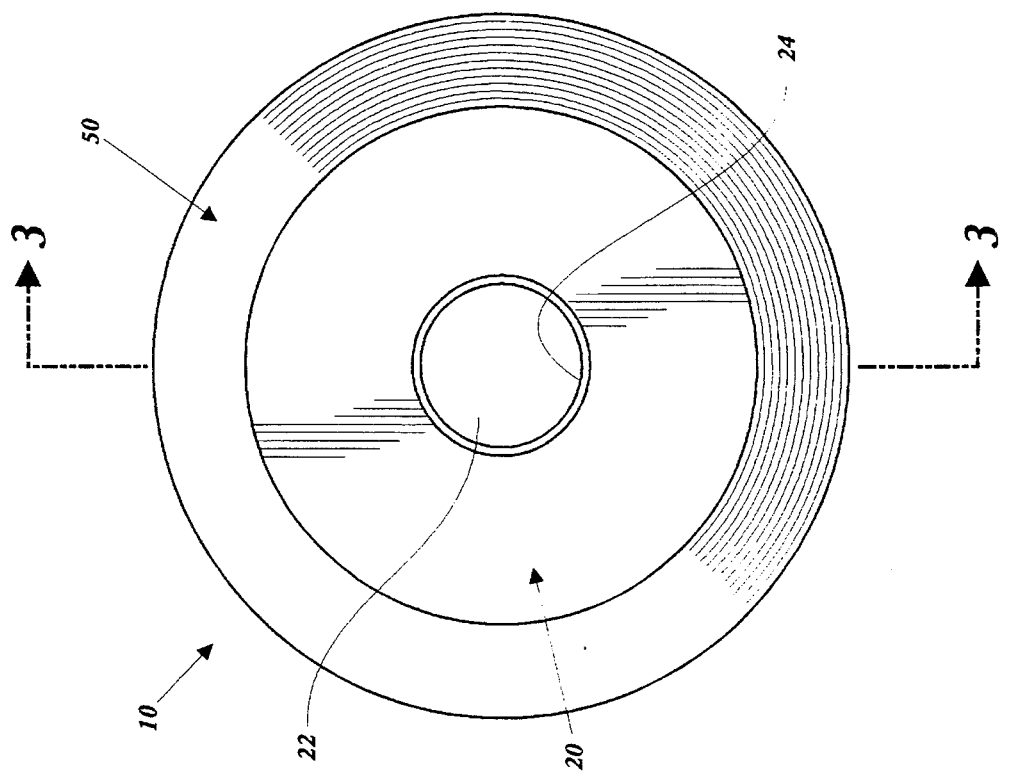
FIG. 2 is a rear elevational view of the improved performance skate wheel of FIG. 1.
Figure 1:
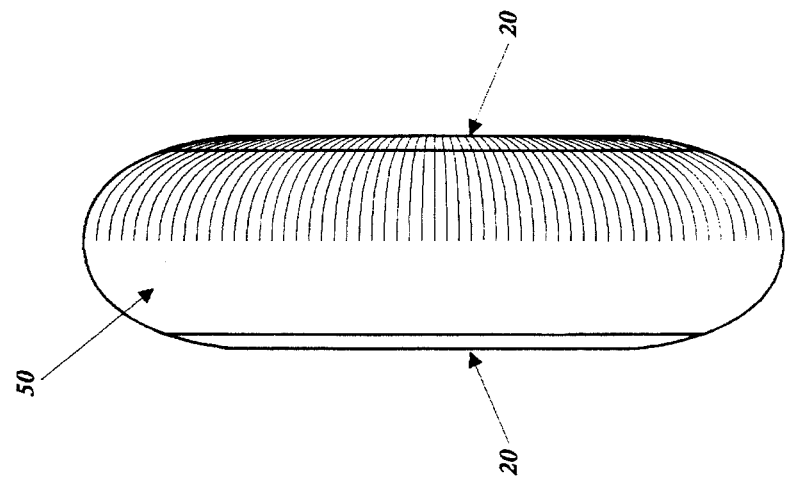
FIG. 1 is a side elevational view of an improved performance skate wheel of the present invention.

Referring now to FIGS. 1 and 2, one embodiment of an improved performance inline skate wheel of the present invention is generally designated 10. The axle and accompanying set of steel ball bearings used to rollingly connect shown wheel 10 with the remainder of the inline skate are well known in the art and are therefore not shown. While referred to herein as an inline skate wheel, wheel 10 is not restricted solely to inline skating but rather may find useful application in other sports or activities, for example conventional roller skating, where the lightweight characteristics of the wheel are advantageous.

Wheel 10 essentially consists of a rigid or sturdy hub, generally designated 20, and a ground engaging tread, generally designated 50. Tread 50 extends circumferentially around hub 20. Hub 20 includes a central aperture 22 and an annular seat 24. Aperture 22 in hub 20 is sized and shaped to receive therethrough the wheel axle. Annular seat 24, which is concentric with aperture 22 as well as recessed from the lateral or axially outward side of hub 20, provides an axially inward stop for the steel ball bearing to be mounted between the axle and hub 20.

Figure 3:
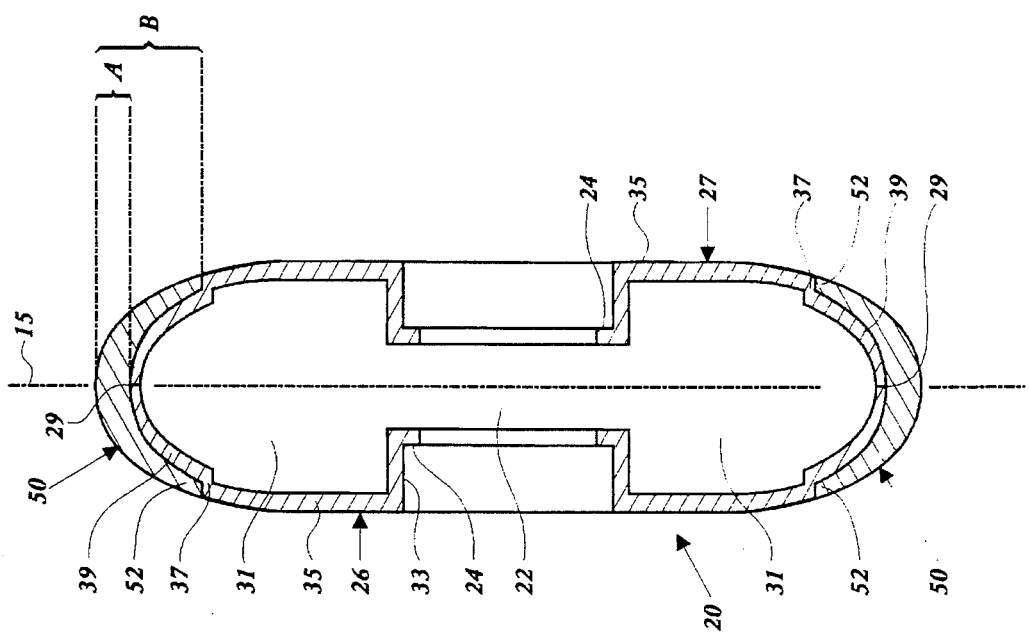
FIG. 3 is a radial cross-section, taken along line 3—3 of FIG. 1, of the improved performance skate wheel of FIG. 1.

Referring now to FIG. 3, the construction of hub 20 and tread 50 are illustrated in radial cross-section. Wheel 10 has this same cross-section for all 360° of radial cross-section. In addition, wheel 10 is symmetrical with respect to centerline 15 which, for explanation herein, defines the vertical direction. Hub 20 comprises opposite hollow mating shell members 26, 27 which form the radial and axial periphery of hub 20. Shell members 26, 27 are mirror images and are therefore shell halves. Differently shaped complimentary members which combine to provide the overall form of hub 20 could be substituted for shell halves 26, 27, and these complementary members could even be nested to provide an overlapping contact area as opposed to a vertical seam contact area. Shell halves or members 26, 27 contact at seam 29, which is located on centerline 15 and extends around the entire circumference of wheel 10. For the remainder of wheel 10, shell members 26, 27 are in an axially spaced apart relationship and define a hollow hub interior or space 31. In an alternate embodiment shown in FIG. 4, and with the exception of that volume coaxial with aperture 22, a very low density filling or insert 60 fills the entire hollow hub interior 31 between shell members 26, 27. As used herein, very low density means a density of less than about three pounds per cubic foot.

Because of their symmetry, the following more particular description of the configuration of shell member 26 applies as well to shell member 27. Starting at its radially inward end and moving outward, shell member 26 includes annular seat 24, horizontal bearing supporting surface 33, hub side 35 which along its radially extending length is vertical except for an axially inwardly tapered region at its radially outward end, horizontal step portion 37, and an arcuate or elliptically curved tread mounting surface 39 which is radially convex, i.e. protrudes radially outwardly. Bearing supporting surface 33, and annular seat 24, are sized and shaped such that they receive in a press fit the steel ball bearing commonly used with standard inline skate wheels. The tapered region of hub side 35 is so shaped such that even when a skater turns sharply, which causes wheel centerline 15 to be angled with respect to the ground while a portion of tread 50 proximate end 52 engages the ground, hub 20 itself does not scrape against the ground. In addition, although hub side 35 is shown as a solid disc shaped member in FIG. 1, and provided it maintains sufficient rigidity to support operational loads, hub side 35 could be formed with openings to further reduce hub weight.

The physical construction of hub 20 which allows it to withstand the sizable loadings experienced during operation utilizes a high strength, low weight woven fiber composite shell. As used herein, a composite refers to the product resulting from the application, to a binder, of a liquid which cures to a solid state. In a preferred construction, hub 20, and more particularly hollow mating shell halves 26, 27, are formed of a woven carbon fiber composite. Thus, the carbon fiber is the binder of hub 20, and the coating applied in the manufacturing process is the liquid which cures to the solid state. Although other materials such as for example woven KEVLAR™ fiber or glass fiber can be employed as a binder, carbon fiber is presently preferred due to its high strength. Wheel 10 has a monocoque construction, i.e. the exterior or outer shell, which is made of the carbon fiber composite, bears most of, and in the embodiment of FIG. 3 all of, the radial loads experienced during use when wheel 10 engages the ground. The wheel 10 shown in FIG. 4 can also be considered to have a monocoque construction as filling or insert 60 contributes only a small amount of radial force supporting structure to hub 20. Filling 60 primarily provides wheel 10 with more rigidity in the axial, as opposed to radial, direction. Additional radial spokes within hollow hub interior 31, or axial supports extending between hub sides 35, undesirably add extra weight but could be employed if, for example, the hub outer shell were to be made less rigid.

Tread 50 is mounted on hub 20, and more particularly on the tread mounting surfaces 39 and step portions 37 of both shell halves 26, 27. The radial range of tread 50, from its outermost radial limit along centerline 15 to its innermost radial limit at ends 52, is represented by the dimension B. The greatest thickness of tread 50 is present along seam 29 or centerline 15 and is represented by the dimension A. As tread 50 extends in both directions away from seam 29 and over the tread mounting surfaces 39, i.e. simultaneously radially inward and axially outward, tread 50 tapers in thickness toward radially inward ends 52. The tapering in thickness of tread 50 covering tread mounting surfaces 39 is functionally permissible as these inward portions of tread 50 experience less frequent surface contact. For example they typically come into direct engagement with the ground only when a skater pushes off or turns, and therefore experience less wear than is experienced at the tread centerline. Moreover, the tapering of the tread thickness is highly desirable from a weight standpoint. Every bit of excess tread removed from wheel 10 minimizes the weight with which a skater is burdened over the duration of a race. Specifically, because shell tread mounting surface 39 can be shaped to provide any desired taper of tread 50 and thereby enclose a differently sized internal volume within hub 20, the excess tread otherwise present is replaced with either a larger hollow hub interior 31 or possibly a larger low density or foam core 60, both of which result in a lighter wheel 10.

At inward ends 52, tread 50 is substantially flush with hub side 35 and has a finite thickness approximately equal to the extent of horizontal step portion 37. Step portion 37 and the corresponding finite thickness of tread 50 are provided to improve the integrity of the attachment of tread 50 to hub 20. Alternatively, a preferred complementary hub and tread design for the wheel embodiments of FIGS. 1-5 dispenses with step portions 37, and effectively results in tread mounting surface 39 being contoured to blend into hub side 35 and with tread 50 continuously tapering in thickness radially inward until no more than a film thickness coating on the surface of hub 20 is provided. This tread embodiment allows for the use of a hub which is less susceptible to breakage by virtue of the lack of step portions in the hub. The omission of step portions 37 may diminish the integrity of the attachment of tread 50 to hub 20 to some degree, however, the additional strength imparted to the hub by the omission of step portions 37 is believed to outweigh this lack of attachment strength in many applications.

Tread 50 is constructed of an elastomeric material, such as an elastomeric urethane, which possesses better traction properties than the carbon fiber composite of hub 20 to allow the skater to push off or turn with a minimum of slippage. While tread 50 also tends to slightly cushion the ride of a skater, this cushioning function is incidental to its traction function as too much cushioning may undesirably absorb and lose valuable energy. Tread 50 is intended to be a limited life tread. Preferably, the thickness of tread 50 is designed to only last for a finite distance. Specifically, wheels 10 may be manufactured with various dimensions A and B which are a function of race demands and conditions. For instance, when competing in a race of 100 miles or multiple races totalling about 100 miles over a standard surface such as asphalt, a competitor utilizing inline skates with wheels of the present invention would select wheels 10 having a dimension A varying between about 3–7 mm and a dimension B varying between about 10–15 mm. It will be appreciated by those of skill in the art that the specific dimensions affect the feel of the wheel to a skater and are therefore dependent on the personal preference of the skater. These dimensions assume that the preferred tread composition identified below is on each wheel, and further that wheel 10 fits standard inline skates and therefore has, for example, a diameter of approximately 80 mm and an axial width of approximately 24.5 mm. At the completion of this race or races, the tread 50 of the selected wheel 10 should be nearly worn away and hub 20 would in practice require a replacement tread prior to any extended future use. In addition, under these same tread composition and wheel size assumptions, when a rougher surface or pavement is expected for a 100 mile race, or a more abusive or demanding use such as hockey is intended, a wheel 10 manufactured to have larger dimensions A and B than the above wheel should be selected by the skater. Of course, a small safety factor tread thickness will be provided such that the moment a skater crosses the finish line at the end of a race of a set distance the tread will not immediately begin to wear through. Moreover, these dimensions will be determined experimentally.

The actual manufacture or fabrication of wheel 10 of the embodiment described occurs by first forming hub 20 and then connecting, and preferably bonding, tread 50 to the tread mounting surfaces 39, and if present step portions 37, of hub 20. During the hub forming process, the woven carbon fiber material and composite coating material used to form the shell halves 26, 27 of hub 20 are combined by the manufacturer of the wheels in preparation for the molding process. This combining step, which involves coating or applying the composite coating to the carbon fiber material, occurs prior to the compression molding process.

The presently preferred woven carbon fiber fabric, which can be obtained from Advanced Composites Group, Inc. of Owasso, Okla., weighs approximately sixteen ounces (454 grams) per square yard. This fabric, due to its fibrous makeup, has a porous construction and a non-uniform thickness of approximately 0.020 inch. The porous construction of the carbon fiber fabric provides voids or interstices into which the subsequently applied urethane coating penetrates before it solidifies, allowing the coating to adhere tightly to the carbon fiber material and thereby not chip off or otherwise be easily removed. Although a preferred woven carbon fiber fabric has been described, one skilled in the art will recognize that other suitable fiber fabrics may be substituted without departing from the teachings of the invention.

With respect to the composite coating, it is known in the art of composite coatings that numerous coatings, such as an assortment of long chain polymers, can be employed to stiffen or harden items such as woven carbon fiber materials. Coatings comprising a wide variety of one or more long chain polymers may be used to stiffen the carbon fiber material of hub 20. Although a preferred coating composition is identified hereinbelow, one skilled in the art will recognize that other suitable long chain polymeric compositions may be substituted without departing from the teachings of the present invention. The stiffening of the carbon fiber material of hub 20 refers to the finished hub's ability to withstand external forces or loadings, substantially radially in direction, encountered during use. The preferred coating is a urethane composition available from Ad-Tech of Charlotte, Mich. This composition, identified by the manufacturer as EL-301, is supplied by the manufacturer as an unmixed, two-part mixture comprising a resin (designated "Part A" by the manufacturer) and a hardener (designated "Part B" by the manufacturer). The manufacturer's suggested mixture combination of EL-301 is 100 parts by weight Part A with 25 parts by weight Part B. The resulting urethane has a hardness of 88D.

The EL-301 urethane is prepared by mixing the two part mixture according to the manufacturer's suggested combination specified above. The prepared EL-301 urethane is then applied as the composite coating onto the carbon fiber material. For example, at a room air temperature of about 77° F. (25° C.), the application of the EL-301 urethane should occur within twenty minutes after mixing, as further delay makes application more difficult as the urethane begins to slightly harden. At a room air temperature above about 77° F. (25° C.), the urethane should generally be applied within a shorter time period, as it begins to harden more quickly at higher temperatures. Conversely, at a room air temperature below about 77° F. (25° C.), the urethane may be applied over longer periods of time. The coating is applied to a generally uniform thickness by brush. An application of approximately 259 grams of the EL-301 urethane mixture per square yard of carbon fiber material used to make shell halves 26, 27 is preferred. It is believed that the composite coating should contribute around 40% to 50% of the total carbon fiber composite weight in order to provide the optimal strength to weight ratio for the composite. Rather than brush application, the composite coating may instead be spray applied.

Rather than the wheel manufacturer applying the composite coating to the dry carbon fiber fabric, a composite prepreg can instead be employed. Composite prepregs may be essentially uncured carbon fiber composites prepared by, for example, a separate manufacturer according to the specifications provided by the wheel manufacturer. The above identified preferred fabric type and construction as well as the preferred composite coating could be the specified prepreg components. The composite prepregs are prepared and then delivered to the wheel manufacturer in a workable form such that the composite prepreg can be introduced into the hub forming process at the point when the compression molding process begins. Prepreg bypasses the necessity of the manufacturer to measure and apply the long chain polymer used in the formation of the composite hub.

After the composite coating has been applied to the woven carbon fiber material, and preferably before around twenty minutes have elapsed since the coating has been applied such that the composite has not hardened to a state which makes the molding process more difficult, the molding process begins. The composite prepreg would also be introduced at this step. A female mold and a male mold are provided from which a hollow mating shell half 26 is formed in a compression molding process. Shell halves 26, 27 may be formed from the same mold pair, but likely will be formed in identically shaped mold pairs when manufactured in a fully automated system. This female mold is shaped to have an interior surface identical to the exterior contour or shape of shell half 26, and the male mold naturally has an exterior surface complementary to the female mold. The female mold interior surface and male mold exterior surface, if made from a material such as epoxy to which the composite coating would adhere, are coated with a waxy substance, such as Mold Release No. 1 available from Ad-Tech of Charlotte, Mich., prior to the actual compression molding of shell half 26. It will be appreciated that no mold release is needed if the female mold and male mold are made from a material, such as aluminum, to which the composite coating will not adhere. When the mold release is utilized, the preferred composite coating previously applied to the carbon fiber fabric does not stick or otherwise adhere to this mold release. The female and male molds then operate to sandwich the coated carbon fiber material therebetween, causing the carbon fiber material to conform to the shape of the female mold interior surface.

While maintained sandwiched between the molds, the coated carbon fiber material which eventually hardens to form shell half 26 is left to initially cure at room temperature for the next four to six hours. During this period of time, a hole which forms aperture 22 may be cut from the carbon fiber material and the excess material overlaying the female mold circular outer edge may be cut off such that shell member 26 will then be shaped as shown in FIG. 3. The shell can be cut at any time after 20 minutes at 77° F. (25° C.).

After the initial cure, shell half 26 is removed from the compression mold pair. The carbon fiber material of shell half 26 has been sufficiently stiffened such that shell member 26 will exhibit and maintain the same shape as the interior surface of the removed female mold. However, at this point the urethane coating has not yet been completely cured. Therefore, a final cure is effected whereby shell half 26 is cured at room temperature for preferably five to seven more days to allow the carbon fiber composite to reach its maximum strength. As will be appreciated by those skilled in the art, the final curing time of shell half 26 can be accelerated by providing a higher cure temperature. For the specified composite coating, the maximum effective curing temperature, i.e. that temperature wherein higher temperatures do not cause a faster cure, is about 150° F. (66° C.), and the resulting curing time for these temperatures is about fourteen to sixteen hours.

At this point of manufacture, shell half 26 is then connected or bonded to shell half 27, which has been similarly formed. In order to ensure a proper attachment, the portions of shell halves 26, 27 to be aligned and ultimately connected together at seam 29 are first prepared for connection by reactivating the urethane composite coating. The urethane coating is reactivated by either lightly sanding or applying an acetone wipe to the carbon fiber composite around the entire seam circumference. This reactivation permits the coatings of halves 26, 27 at seam 29 to chemically bond with each other as well as with an additional applied composite coating. During this twenty minute period, an additional urethane coating of around 1.0 grams of EL-301 is brush applied to the seam surface of one of shell halves 26, 27 to act as an additional adhesive agent. Then, and still within the twenty minutes of reactivation, the shell halves 26, 27 are carefully aligned as shown finally connected together in FIG. 3 and pressed together under light pressure, approximately 10 lbs. per square inch applied by machine. The reactivated urethane composite coatings and the additional urethane coating chemically bond together such that seam 29 is believed to effectively molecularly blend into tread mounting surface 39 so as to be structurally indistinguishable therefrom. After an initial cure of 20 minutes to 1 hour, the pressure forcing together shell halves 26, 27 is removed and shell halves 26, 27 are finally cured at room temperature for preferably five to seven more days.

With the exterior surfaces of hub 20 now formed, the next manufacturing step for the embodiment of FIGS. 1–5 involves attaching tread 50 to hub 20. This process preferably involves providing a mating set of tread-forming molds which encapsulate hub 20, and then injection molding of a tread material which hardens to a solid having beneficial traction properties for wheel 10. The mating tread-forming molds are precisely crafted such that when connected together they define an interior shape which conforms to hub 20 along hub side 35 of shell halves 26, 27 and which is spaced apart from tread mounting surface 39 of shell halves 26, 27 around the entire hub circumference. The actual volume or space between the tread-forming molds and tread mounting surface 39, which is filled during tread injection molding to form tread 50, is naturally contoured as tread 50 is shown in FIG. 3. In order to provide different tread thicknesses and shapes, differently shaped mating tread-forming molds can be utilized.

An initial step in attachment of tread 50 onto hub 20 is preparation of both the attachment surfaces of wheel hub 20 and of the interior tread forming surfaces of the mating tread-forming molds. Around the entire hub circumference, the composite coating of horizontal step portions 37, if present, and tread mounting surfaces 39 is reactivated by light sanding or acetone wipe. The tread forming surfaces of the mating tread-forming molds are coated with a material, such as Mold Release No. 1 available from Ad-Tech of Charlotte, Mich., to which the urethane elastomer preferably used to form tread 50 will not adhere, or these surfaces are made from a material such as aluminum to which the tread will not adhere. Then, the prepared hub 20 is inserted into one of the mating molds and the tread-forming molds are connected together to substantially encapsulate hub 20 therein. Before the reactivated composite coating of hub 20 fully cures, the material which solidifies to form tread 50 is then injected in flowing form through a port in the mating tread-forming molds. A preferred material is a type of urethane elastomer available from Castall Inc. of Weymouth, Mass. This preferred material, identified by the manufacturer as Castall UX-8708 R/I is supplied by the manufacturer as an unmixed, two-part mixture comprising a part A (designated "UX-8708 Resin" by the manufacturer) and a part B (designated "UX-8708 Isocyanate" by the manufacturer). The manufacturer's suggested mixture combination of UX-8708 R/I is 7.6 parts by weight Part A with 100 parts by weight Part B. The resulting urethane elastomer has a hardness of approximately 82 A, and provides acceptable traction characteristics. Other known tread-forming materials, including urethane elastomers having different hardnesses, may be substituted for the identified material. For example, tread substitution with materials having lower or higher hardnesses may be desirable depending on the ground surface type and condition expected to be encountered by a wheel user.

In order to desirably avoid air pockets or bubbles within the finished tread 50, the process of preparing the urethane elastomer which forms tread 50 and then injecting the mixture into the tread-forming molds is preferably conducted in an airless or vacuum system. In this airless system, the UX-8708 R/I urethane elastomer is prepared by heating the individual components of the two part mixture to about 100° C. and then mixing the two part mixture according to the manufacturer's suggested combination specified above. During its six minute working time after preparation, the mixed urethane elastomer is injected into the tread-forming molds and thereby circumferentially surrounds the held hub 20. The reactivated hub composite coating and the urethane elastomer tread chemically interact such that when cured, tread 50 will be chemically bonded to hub 20. After an initial cure or demolding time of about one hour, the mating tread-forming molds are removed, and wheel 10 and more particularly tread 50 is left to finally cure at room temperature for about sixteen hours. As explained above with respect to the hub curing process, increased curing temperatures will accelerate the curing period of tread 50. To further ensure a secure attachment between the tread and hub, especially for wheels to be used at high speeds with high loads, an adhesive between the tread and hub may additionally be employed.

Figure 4:
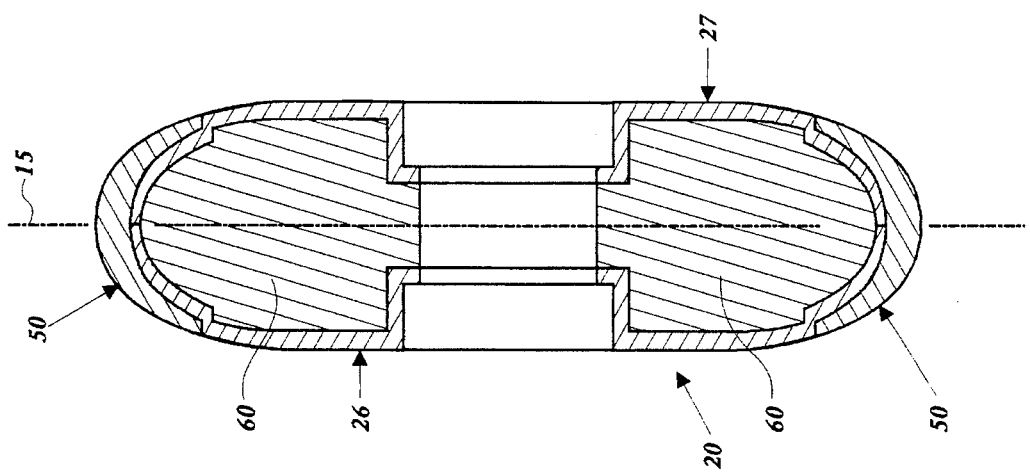
FIG. 4 is an alternate embodiment of an improved performance skate wheel of the present invention wherein the hub interior is filled with a low density filling.

It will be appreciated that in order to form the alternate wheel embodiment shown in FIG. 4, another manufacturing step, namely injecting the low density filling, is required. This process step preferably occurs before the tread mounting step described above but after the shell halves have been attached together and cured. The lightweight filling 60 is made of a very low density foam material or polyisocyanurate material which is either capable of withstanding the high temperatures experienced during tread formation, i.e. not melting, or which, upon melting and the resulting solidification, does not create a heavy spot or eccentricity in the wheel which unacceptably detracts from the wheel performance. The filling material presently utilized is a rigid low density polyisocyanurate material available from Ad-Tech of Charlotte, Mich. The polyisocyanurate is supplied by the manufacturer as an unmixed, two-part mixture comprising a resin (designated "Part A" by the manufacturer) and a hardener (designated "Part B" by the manufacturer). The manufacturer's suggested mixture combination of polyisocyanurate is 100 parts by weight Part A with 100 parts by weight Part B. As the effective working time for this material is only about twenty seconds, it is preferable that the mixture actually be mixed within the internal space between attached shell halves 26, 27 of hub 20 such that the rapid filling solidification only occurs therein. Therefore, in a mixing process well known in the art, and using an annular mold, having two nozzle openings spanning the annular seats 24 of shell members 26, 27, two nozzles separately inject the mixture components within the interior of hub 20 where they mix and quickly solidify. After approximately four minutes have elapsed after injection, the annular mold can be removed, leaving a filling 60 as shown in FIG. 4. Filling 60 should then be allowed to finally cure for around one hour at room temperature. Then, tread 50 can be attached to this hub embodiment as described above.

Because tread 50 is designed and variably constructed to only last for a certain amount or use and wear, it will be appreciated that tread 50 wears out before the useful life of hub 20 has expired. To capitalize upon this hub useful life, a skater will be able to return hub 20 to the manufacturer where a rebuilt wheel 10 will be created by application of a new tread 50. Specifically, the exposed circumference of wheel 10 which remains after use, which will likely be part worn tread 50 and exposed hub 20, will be treated by light sanding or with an acetone wipe. This treatment reactivates the urethane components. The treated wheel will then be reinserted into tread-forming molds and, as described above, a new tread 50, shaped either identically to or differently from the previous tread, will be injected molded on the wheel. After proper curing, the rebuilt wheel 10 can be returned to the skater for another race.

Figure 5:
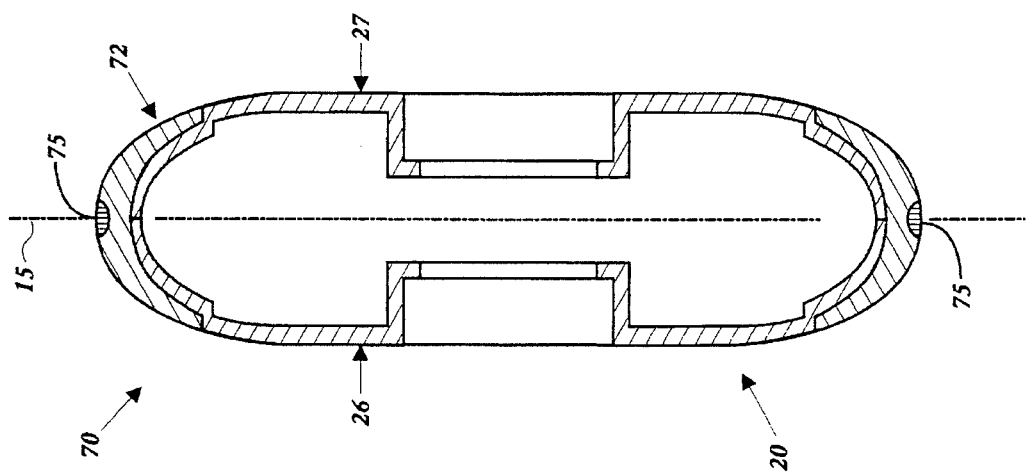
FIG. 5 is a radial cross-section of an alternate embodiment of the tread of an improved performance skate wheel of the present invention.

Referring now to FIG. 5, shown is a radial cross-sectional view, similar to the view of FIG. 3, of another embodiment of the improved performance inline skate wheel of the present invention wherein corresponding parts are correspondingly numbered. Wheel 70 is structurally identical to wheel 10 shown in FIG. 3 with the exception of a slightly modified tread 72. In particular, tread 72 has been altered to include an inset wear strip channel 75 positioned flush with the most radially outward portion of tread 72. Wear strip channel 75 is axially centered on tread 72, or in other words lies along centerline 15, and preferably continuously extends around the entire circumference of wheel 70. The axial width of wear strip channel 75 is approximately that width of tread 50 of FIG. 3 which normally contacts the ground when a 150 lb. user wearing skates with the invention wheel 10 stands up in a manner such that the wheel 10 is positioned vertically. The radial or channel depth of wear strip channel 75 is less than the centerline thickness of tread 72, and will be approximately 1.0 mm in depth when tread 72 is 3.0 mm thick at that location. During its normal use, wheel 70 contacts the ground along this wear strip channel width a considerable portion of the time. As wear strip channel 75 is comprised of a material having a harder and more wear resistant composition than the preferred urethane elastomer for the remainder of tread 72, the increased wear resistance lengthens the operational life of wheel 70. Moreover, wear strip channel 75 does not appreciably impair wheel traction as the central tread width occupied by wear strip channel 75 contributes but a minor amount to the traction properties of wheel 70. Alternatively, under some conditions, it may be desirable to provide a wear strip channel 75 comprised of a material having a softer and less wear resistant composition than the preferred urethane elastomer.

An alternate embodiment of the present invention which provides a replaceable tread for a skate wheel is illustrated in FIGS. 6–9. The wheel with replaceable tread is generally designated 80 and can be described in its most basic form as having a hub portion, generally designated 85, and a replaceable tread, generally designated 130, which can be mechanically attached to or mechanically detached from hub portion 85. Mechanically is broadly used herein to differentiate the physical or manual type of attachment between replaceable tread 130 and hub portion 85 from the chemical bonding or attachment between the tread and hub described in reference to the embodiments shown in FIGS. 1–5.

Figure 7:
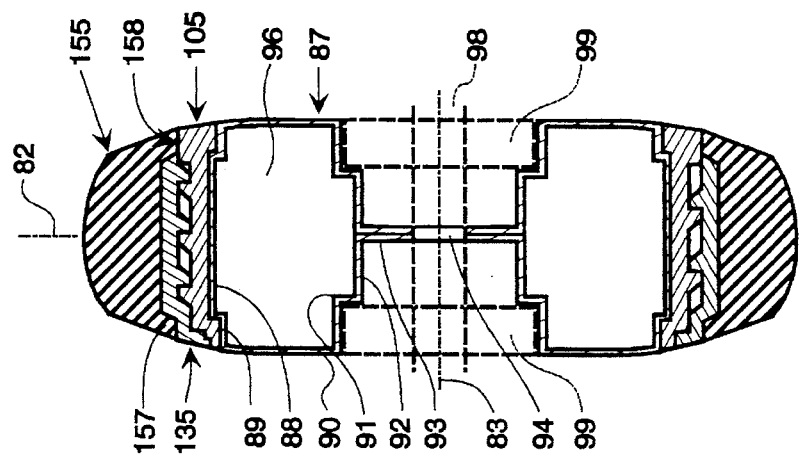
FIG. 7 is a radial cross-section, taken along line 7—7 of FIG. 6, of the skate wheel with replaceable tread of FIG. 6.
Figure 6:
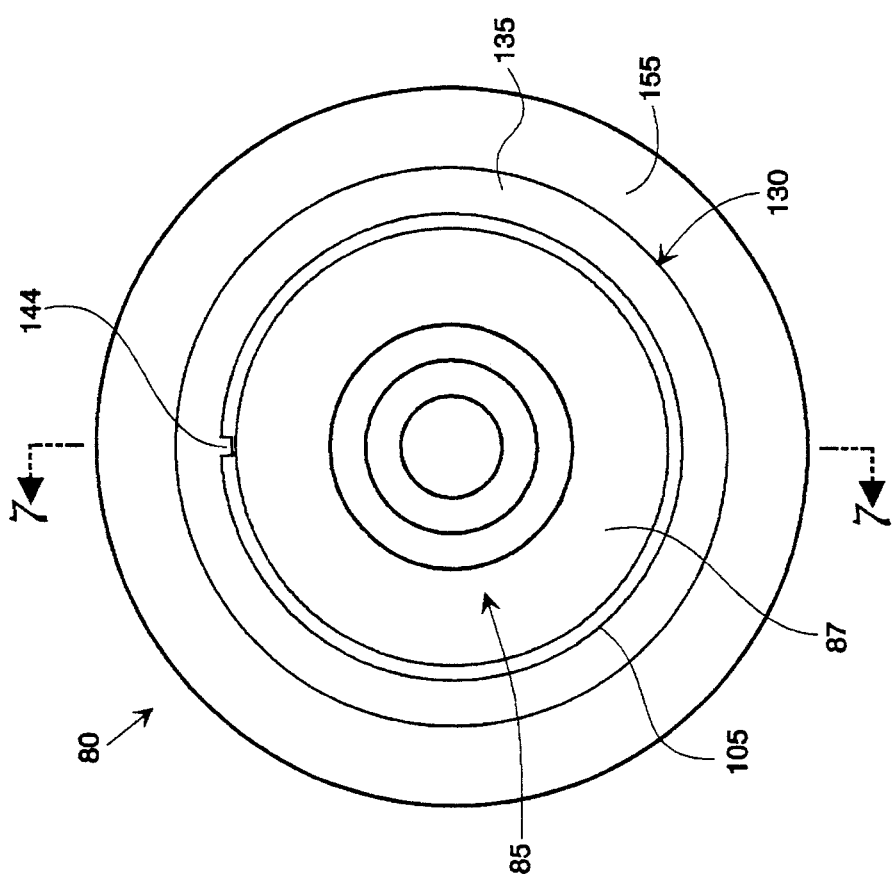
FIG. 6 is a side elevational view of an improved performance skate wheel of the present invention having a replaceable tread.

As shown in FIGS. 6 and 7, hub portion 85 includes both a tread receiving ring 105 and a central hub 87, which is central in that it extends radially outward from wheel mounting axle 98 to ring 105. Central hub 87 in this preferred wheel with replaceable tread embodiment is symmetrical with respect to vertical centerline 82, as well as to horizontal centerline 83. Consequently, the following explanation with respect to one quadrant of the hub is equally applicable to the other hub portions.

Central hub 87 is formed or shaped as a shell from a carbon fiber composite. The hub shell, when viewed in cross-section as shown in FIG. 7, includes a generally horizontal ring attaching segment 88 at the central hub outer periphery, an L-shaped or stepped segment 89 for achieving a snap fit with ring 105, a hub side 90 which begins to axially taper at its outer radial limit, a stepped bearing mounting segment 91, a connecting segment 92, and a center segment 93 in which an aperture 94 is provided. Because the hub shell is uniform around its entire circumference, each of the shell components or segments identified above is actually annular in shape. While central hub 87 could still perform satisfactorily if the hollow interior defined by the hub shell portions disposed on opposite sides of vertical centerline 82 was left unfilled, in the preferred embodiment a low density filling 96 fills the entire hollow interior. Filling 96 contributes to the rigidity and strength of central hub 87 while adding minimal weight. In addition, filling 96 serves as a permanent mold in the preferred hub forming process described further below.

Aperture 94 in hub center segment 93 is sized and shaped to receive therethrough a wheel axle, and stepped bearing mounting segment 91 is designed and constructed to frictionally mount a ball bearing. The wheel axle 98 and ball bearing 99 are shown abstractly and in shadow in FIG. 7, but structural details of these conventional bearing components are not further described herein as they are well known in the trade and are not necessary for a clear understanding of the invention. Moreover, the identification of these bearings is not intended to be limiting in any manner, as alternate bearing types or constructions are not precluded from being employed with the teachings of the present invention.

Referring now most particularly to FIGS. 7 and 8, the configuration of tread receiving ring 105 will be more particularly described. Ring 105 is preferably formed in one piece from an injection molded plastic type material, such as nylon. The nylon of ring 105 has sufficient elasticity to allow ring 105 to be slightly deformed under force during its coupling assembly with central hub 87. Ring 105, which is generally annular in shape in that it extends around the circumference of central hub 87, is uniformly shaped around its entire circumference except for the presence of locking recess 118 and thread 120, which is arranged in a spiral fashion. Ring 105 includes an inner radial periphery or surface 107, an outer radial periphery or surface 109, and opposing axial sides 110, 111 contoured with the respective hub sides 90. An interior squared recess in inner radial surface 107, shaped to tightly fit over ring attaching segment 88 of hub 87, causes ring 105 to include opposing mounting shoulders 113, 114 and a horizontal spanning portion 115 therebetween. Spanning portion 115 terminates prior to axial side 110, thereby forming a hollow which receives a radially inwardly extending lip 142 of tread attaching ring 135. A locking recess 118 is formed into mounting shoulder 113. Spanning portion 115 also terminates at axial side 111 and includes a tread supporting ridge 116, which extends radially outward therefrom and defines a part of side 111.

The outer radial periphery 109 of tread receiving ring 105 includes a thread 120 which is formed integral with and projects from spanning portion 115. Thread 120 is the portion of ring 105 which during attachment operatively receives replaceable tread 130. Thread 120 continuously extends around the circumference of ring 105 in a spiraling fashion, such that the length of thread 120 is helical in shape. Consequently, all of the thread portions shown projecting from spanning portion 115 in the Figures are part of the same thread 120 and are referenced accordingly. Thread 120 preferably spirals around ring 105 at a pitch which achieves the presence of approximately three threads, i.e. three passes of spiralling thread 120, per inch of the axial width of ring 105.

For a given thread design the number of threads per axial inch affects the friction force which must be overcome to rotate the tread receiving and attaching rings relative to each other. Different thread pitches yielding either more or less threads per inch could be employed if a different friction force connection were required. However, if too many threads are employed, the friction force would prevent many users from being able to manually screw replaceable tread 130 on hub portion 85. In addition, it will be appreciated that more than one thread, spiralling either fully or partially around ring 105, could be employed provided complementary changes in tread attaching ring 135 were made.

The actual construction of thread 120 is best illustrated in the enlargement shown in FIG. 9. Thread 120 mates and engages with a similarly formed and complementary thread attaching device, i.e. thread 147 of tread attaching ring 135. Thread 120 has a flat engaging surface 121, an opposing beveled surface 122, and a axially aligned connecting surface 123. Threads 120 and 147 could be alternatively formed. For example, engaging surface 121 could be beveled as a mirror image of beveled surface 122, and naturally the engaging surface on thread 147 would be complementarily shaped. However, the instant shape is preferred as it is believed to provide a tighter interference or friction fit.

In the assembly of central hub 87 with tread receiving ring 105 to form hub portion 85, an adhesive is first placed on the ring inner surface 107, i.e. the underside of mounting shoulders 113, 114 and spanning portion 115, to ensure a more secure connection therebetween. This adhesive, which is preferably Fusor 322 made by Lord Corporation of Erie, Pa. or alternatively Loctite 33201 made by Loctite Corporation of Newington, Conn., is distributed on inner surface 107 in an amount of about 1 gram per wheel. The adhesive coated ring 105 is then worked onto central hub 87 such that mounting shoulders 113, 114 snap into engagement with L-shaped segments 89, whereby the adhesive contacts and binds with segments 89 and ring attaching segment 88.

As shown in FIGS. 6 and 7, replaceable tread 130 includes both a ground engaging tread 155 and a tread attaching ring 135, designed to be threaded together with tread receiving ring 105. Referring most particularly to FIGS. 7 and 8, the configuration of tread attaching ring 135 will be more particularly described. Similar to ring 105, tread attaching ring 135 is preferably formed in one piece from an injection molded plastic type material such as nylon. Ring 135, also generally annular in shape, basically includes an inner radial surface 137 and an outer radial surface 138 which define therebetween a spanning segment 140 and stop lip 142. Ring 135 is uniform around its entire circumference except for locking tab 144, as well as thread 147, which has a uniform thread cross-section but spirals around the ring circumference. Lip 142 is positioned at one axial side of ring 135, or the left side in FIG. 8, and extends radially inwardly from spanning segment 140. Lip 142, which is sized to fit within the hollow between inner ring mounting shoulder 113 and inner ring spanning portion 115, guides the extent to which hub portion 85 and replaceable tread 130 are fastened or screwed together. In particular, lip 142 contacts the axial edge of spanning portion 115 to prevent further tightening of rings 105, 135.

A locking tab 144 (See FIG. 6) integrally formed with lip 142 extends radially inwardly therefrom and is shaped complementary to locking recess 118. When inner ring 105 and outer ring 135 are nearly completely assembled, locking tab 144 is slightly bent upward by its contact with the unrecessed edge of mounting shoulder 113 until the point tab 144 is aligned with locking recess 118. When alignment occurs, due to the elasticity of its nylon construction locking tab 144 snaps downward into a locking orientation. The engagement of tab 144 by the boundaries of recess 118 prevents further relative rotation between rings 105 and 135, or in other words locks the wheel components in an operational orientation. To allow for the rings to be unscrewed to thereby detach replaceable tread 130 from hub portion 85, locking tab 144 must initially be pried up and rings 105, 135 rotated such that tab 144, upon its release, does not return into its locking engagement with recess 118. In addition, the mating threads of rings 105 and 135 are particularly designed such that this locking engagement between tab 144 and recess 118 only occurs when replaceable tread 130 is properly or operationally attached to hub portion 85.

Ground engaging tread 155 is attached to the outer radial surface 138 of tread attaching ring 135. Tread 155 is preferably made of a high rebound urethane elastomer which rates approximately 70% or higher on the Bay Shore Scale and which has a durometer hardness of 75 A or greater. The preferred urethane is the Castall UX-8708 R/I material described above, which is injection molded onto and into contact with outer radial surface 138 of tread attaching ring 135 in a manner similar to the manner described above. Alternatively, tread 155 could be formed of vulcanized rubber material. This rubber material should have viscoelastic characteristics similar to the high rebound characteristics of the urethane elastomer. An adhesive or bonding agent may be used to bond tread 155 and ring 135 such that tread 155 will not shear away during use. It is believed that the adhesive or bonding agent may not be required in all applications, and the desirability of utilizing such an agent may be determined by those of skill in the art upon routine experimentation.

Ground engaging tread 155 is shown having radial fingers 157, 158 which extend into hollows on opposite sides of spanning segment 140. Fingers 157, 158 respectively abut and are supported by the topside of lip 142 and tread supporting ridge 1.16. Ground engaging tread 155 can be formed in a variety of shapes, including limited life treads described above, and naturally tread attaching ring 135 can be modified to change the cross-sectional shape of tread 155. For example, for a given tread profile, if ring 135 is provided with a radially convex bulge or curvature, less urethane elastomer is required to form tread 155.

Along the inner radial surface 137 of outer ring 135 is spiralling thread 147, which is formed integral with and projects from inner radial surface 137. Thread 147 extends around the circumference of ring 135 in a spiraling fashion similar to the configuration of thread 120 described more fully above. Designed to threadedly engage or mate with thread 120 of tread receiving ring 105 in a friction fit, thread 147 is the operative tread attaching portion of ring 135. Threads 120, 147 are preferably right-handed screw threads and engage around the entire wheel circumference. The shadow lines 150 in FIG. 8 represent the points of engagement between threads 120, 147 behind the portion of rings 105, 135 shown.

In order to attach replaceable tread 130 to hub portion 85, tread 130 and hub portion 85 are axially aligned and the hub portion 85 is inserted, with the side having locking recess 118 as the leading side, into the replaceable tread 130, with the side opposite locking tab 144 as the receiving side.

Clockwise rotation of hub portion 85 relative to tread 120, as viewed from the right side in FIG. 7, tightens the pieces together. Attachment is complete, and the wheel ready for operation, when locking tab 144 snaps into locking recess 118.

It will be appreciated that rather than engaging threads, rings 105 and 135 could achieve a mating relationship which provides for tread attachment and detachment in a number of ways. For example, a mating thread and groove pattern could be used as the tread receiving and tread attaching mechanisms. In addition, replaceable tread 130 could be attached to a hub portion which lacks an intermediate tread receiving ring 105. For example, a central hub, whether formed of carbon fiber fabric composite or as a solid piece entirely from a material such as nylon, could have a tread receiving means, such as threads, formed directly in its radial periphery. Moreover, without ring 105 and while still employing a central hub substantially as shown in FIG. 7, and provided the tolerances were closely maintained or an additional device to prevent relative rotation between the attached components was employed, outer ring 135 could be formed with an inner radial surface identical to the inner radial surface 107 of ring 105 described above. If so formed, central hub ring attaching segment 88 would function as the tread receiving mechanism which snap fits with the recess, or tread attaching mechanism, of outer ring 135.

A preferred process and mold apparatus for forming a skate wheel composite hub is described with particular reference to the formation of central hub 87 used in wheel 80 and is illustrated in FIGS. 10 and 11. A mold apparatus, constructed from aluminum or another material to which the composite coating material will not adhere, includes a lower mold member 170, an upper mold member 175, and four intermediate mold members 180–183. With reference to FIG. 11, lower mold member 170 includes a horizontal base surface 171 with an interior cavity 172 formed therein. Centrally disposed within cavity 172 is a two-tiered projection 173 which extends above the elevation of surface 171 and functions to produce the stepped bearing mounting segment 91, connecting segment 92, and center segment 93 of the finished product hub shell. As shown in FIG. 11, cavity 172 is shaped to correspond to the exterior contour of substantially an entire axial half, including hub side 90 and stepped segment 89, of the finished product hub shell. Cavity 172 does not correspond to an entire half of the finished product hub shell as at its outer periphery it defines or provides a mold surface for only a portion of the cross-sectional extent of ring attaching segment 88. Upper mold member 175 is a mirror image of lower mold member 170 and therefore includes horizontal base surface 176, cavity 177, and two-tiered projection 178.

Intermediate mold members 180–183 are slidable along lower mold member lateral surface 171 from a retracted state or position, such as the position of mold member 183 in FIG. 10, to a converged state or position, such as the positions of mold members 180–182 in FIG. 10. Intermediate mold members 180–183, besides each having flat and parallel top and bottom surfaces, include hub periphery forming surfaces 185–188 which in horizontal cross section are arcuate shaped. The hub periphery forming surfaces 185–188 are sized and shaped such that when intermediate mold members 180–183 are aligned in a converged state, surfaces 185–188 closely radially conform to the circumference, as well as encircle the full 360° circumference, of the finished product central hub periphery. When positioned in the converged state, the outer edges of mold members 180–183 are coextensive with the outer edges of lower mold member 170.

The actual use of the mold apparatus to form central hub 87 proceeds as follows. While upper mold member 175 is removed from above lower mold member 170, and with intermediate mold members 180–183 retracted, a piece of untreated woven carbon fiber fabric is centered and laid onto projection 173 of lower mold member 170. The fabric piece, which is preferably a piece of the sixteen ounces per square yard material identified above, is then pressed downward into cavity 172 without being stretched. This fabric piece is circular in shape and has been precut preferably so as to have a surface area which is exactly the surface area of half the finished product hub plus the area of aperture 94. In other words, the outer edge of this circular fabric piece, after hub formation is complete, will lie along centerline 82. Because cavity 172 does not outline the entire cross-sectional length of ring attaching segment 88, a portion of the fabric piece overhangs or extends beyond the radial periphery of cavity 172 and radially outward above lateral surface 171.

After the untreated piece of carbon fiber fabric is in place within lower mold member 170, a composite coating material is uniformly applied over the entire upwardly facing surface of the fabric piece. The EL-301 composite coating is preferably used, and is applied as described above.

Before the composite coating of the fabric piece has cured, a substantially doughnut shaped solid insert that functions as a permanent mold member is centered and stacked onto the coated fabric piece within cavity 172. The insert, which is made of a low density material, and preferably from the polyisocyanurate material identified above, will have been previously machined or cast in a manner well known in the art to conform to the space within cavities 172, 177 which during hub production is not to be otherwise occupied by the woven fiber fabric. In other words, the insert is shaped exactly as filling 96 in shown in FIG. 7.

After the solid insert is positioned, a second piece of untreated woven carbon fiber fabric is centered and carefully laid onto the insert. This second fabric piece is identical in size and shape to the first fabric piece already positioned underneath the insert. A composite coating material, of the type and amount described with reference to the first fabric piece, is then applied to the exposed or top surface of the second fabric piece.

Before the composite coatings of either the first or second fabric pieces have fully cured, upper mold member 175 is centered over and lowered, under the force of its own weight of about a pound, onto the second fabric piece such that projection 178 forces the central fabric portion into the bore of the insert. The space between surfaces 171, 176 of mold members 170, 175 at this point will be just slightly larger than the thickness of each intermediate mold members 180–183. While maintaining upper mold member 175 in the spatial relationship that it achieves under its own weight with lower mold member 170, intermediate mold members 180–183 are urged radially inward until they are located in their converged positions. During this radial motion, the arcuate surfaces 185–188 contact the overhanging portions of the first and second fabric pieces which radially extend beyond the respective radial peripheries of cavities 172, 177 and force these overhanging portions to fold toward the solid insert and then press into contact with the insert.

After intermediate mold members 180–183 are fully converged, upper mold member 175 is gradually lowered toward lower mold member 170 over the course of about ten seconds by the application of an increasing force of up to about ten pounds. Any excess composite coating on the first and second fabric pieces is squeezed therefrom and passes out the small gaps between the mold members. The molding process, up to this point, preferably occurs as quickly as possible after the initial application of the composite coating to the first fabric piece such that the coatings do not cure. After upper mold member 175 is forced downward, the hub is left to initially cure in the mold apparatus for approximately two hours at about 140° F. to 150° F., after which it is removed and allowed to finally cure for an additional 5–7 days at room temperature. At any time after the initial cure, bore can be drilled or cut to form aperture 94.

This process described with reference to the formation of central hub 87 is preferred as it is believed to achieve a stronger hub then obtained during a process of mating cured hub halves together. In particular, when being pressed against the solid insert by the intermediate mold members, the overhanging portions of the first and second fabric pieces are still wet, i.e. their respective composite coatings have yet to fully cure. Moreover, due to the precut shape of the fabric pieces, the edges of the overhanging portions of these fabric pieces come into contact with each other around the insert circumference, allowing their exposed carbon fibers to merge or interlock and thereby bridge what would otherwise be a seam therebetween. As the composite coatings cure, the interlocked carbon fibers are made rigid thereat, and the net effect is to create a hub wherein no bond line is readily identifiable between the fabric pieces, thereby achieving a stronger hub. In addition, the center segments 93 formed from the two fabric pieces are attached to make the hub more rigid.

While the maintaining of upper mold member 175 relative to lower mold member 170, the urging of intermediate mold members 180–183 radially inwardly, and the pressing of lower and upper mold members 170, 175 together have been described as a manual process, the process may be performed by machine and in an automatic manner.

It will be appreciated that while the replaceable tread has been explained herein used in conjunction with a lightweight carbon fiber composite hub, the replaceable tread has useful application with other types of hubs. For instance, although not as low in weight as the composite hub, the hub could be formed in one piece from nylon. Also, as described above inner ring 105 could be eliminated if thread 120 were cut directly into the radial periphery of such a nylon hub. Other materials, such as those which are injection moldable or are vacuum formable, may be utilized in forming the hub if they possess sufficient strength and rigidity to withstand operational forces.

While described as preferably formed of a carbon fiber composite, wherein a manufacturer has applied a composite coating to a carbon fiber fabric binder, central hub 87 may be formed from a variety of other materials, including prepregs and other composites identified above, having a high strength to weight ratio. Central hub 87, as well as hub 20, may also be formed from thermoplastic composites. Thermoplastic composites, which are available from Quadrax Advanced Materials Systems, Inc. of Portsmouth, R.I., are fabricated as a commingled yarn system. In particular, strands of thermoplastic material are interwoven with carbon fibers, similar to those fibers used to form the carbon fiber fabrics identified above, to form such a composite. KEVLAR™ or nylon fibers may be substituted for the carbon fibers. Upon being heated to a temperature of over about 400° F., these thermoplastic composites are flexible and shapable and can be formed into a desired shape, such as a hub shell described herein. When cooled, the desired shape is rigidly retained. It will be appreciated that these types of materials may facilitate particular aspects of the instant invention as they eliminate the need to apply composite coatings and instead merely require elevated temperatures, which could be achieved, for example, by preheating the thermoplastic composites before molding or by heating of the mold apparatus disclosed herein.

While this invention has been described as having a number of preferred designs, the present invention may be further modified within the spirit and scope of this disclosure. For instance, the presently preferred woven fiber material and composite coating may be altered. Upon routine road testing and use experiments, a skilled artisan may alter the materials of construction to optimize the ride qualities, such as by providing a slightly less stiff wheel. Moreover, the hub shell and tread do not have to be symmetric about the centerline illustrated herein. This application is therefore intended to cover any variations, uses, or adaptations of the invention using its general principles. Further, this application is intended to cover such departures from the present disclosure as come within known or customary practice in the art to which this invention pertains.

What is claimed is:

1. A skate wheel comprising:

a hub means for being rotatably coupled to a skate, said hub means comprising a tread receiving means; and a replaceable tread mechanically attachable to and mechanically detachable from said hub means, said replaceable tread comprising a ground engaging tread and a means for attaching said ground engaging tread to said tread receiving means;

wherein said tread attaching means comprises a generally annular first member having an inner radial periphery and an outer radial periphery, said inner radial periphery shaped to provide a mating relationship with said tread receiving means; and wherein said hub means comprises a central hub having a radial periphery, wherein said tread receiving means comprises at least one spiralling thread disposed radially outward of said central hub radial periphery, and wherein said first member inner radial periphery comprises at least one complementary spiralling thread to provide said mating relationship with said tread receiving means.

2. The skate wheel of claim 1 wherein said ground engaging tread is connected to said outer radial periphery of said first member to thereby extend circumferentially around said hub means.

3. The skate wheel of claim 1 wherein said tread receiving means comprises a generally annular second member having an inner radial periphery and an outer radial periphery, wherein said at least one spiralling thread is formed in said second member outer radial periphery, and wherein said second member inner radial periphery fits in a mating relationship with said central hub.

4. The skate wheel of claim 3 wherein said central hub comprises a woven fiber composite shell.

5. The skate wheel of claim 3 wherein said first member includes an axial side having a locking tab extending radially inward therefrom, and wherein said second member includes an axial side having a locking recess formed therein, said locking tab shaped complementary to said locking recess to be lockingly maintained therein when said replaceable tread is threadably attached to said hub means.

6. The skate wheel of claim 3 wherein said at least one thread continuously spirals around the circumference of said hub means, said spiraling occurring at a pitch sufficient to achieve the presence of at least three threads per axial inch.

7. A skate wheel comprising:

a central hub having an outer radial periphery;

a tread receiving ring having an inner radial surface and an outer radial surface, wherein said inner radial surface is shaped to mate with said central hub outer radial periphery, and wherein said outer radial surface comprises at least one thread projecting therefrom, said at least one thread spiralling around the circumference of said tread receiving ring;

a tread attaching ring having an inner radial surface and an outer radial surface, wherein said tread attaching ring inner radial surface is shaped to engage said at least one thread; and a ground engaging tread disposed around the circumference of said tread attaching ring and connected to said tread attaching ring outer radial surface, said ground engaging tread being attachable to said central hub by threadedly engaging said tread attaching ring and said tread receiving ring, and said ground engaging tread being detachable from said central hub by threadedly disengaging said tread attaching ring from said tread receiving ring.

8. The skate wheel of claim 7 wherein said central hub comprises a woven fiber composite shell.

9. The skate wheel of claim 7 wherein said tread attaching ring comprises a locking tab and wherein said tread receiving ring comprises a locking recess formed therein, said locking tab shaped complementary to said locking recess to be lockingly maintained therein when said ground engaging tread is completely threadably attached to said central hub.

* * * * *